United States Patent [19]

Coughlin

[11] Patent Number: 4,903,912

[45] Date of Patent: Feb. 27, 1990

[54] TAPE MEASURE BRAKING DEVICE

[75] Inventor: Eric J. Coughlin, Barrie, Canada

[73] Assignee: Cooper Industries, Inc., Houston, Tex.

[21] Appl. No.: 231,292

[22] Filed: Aug. 12, 1988

[51] Int. Cl.⁴ .............................................. B65H 75/48
[52] U.S. Cl. ................................... 242/107.3; 33/767; 242/107.2
[58] Field of Search ................... 242/107, 107.2, 107.3, 242/107.5, 84.8, 107.6; 33/138

[56] References Cited

U.S. PATENT DOCUMENTS

| | | | |
|---|---|---|---|
| 2,250,171 | 7/1941 | Wilkins | 242/107.3 |
| 2,460,082 | 1/1949 | Gray | 242/107.2 |
| 3,482,798 | 12/1969 | Kawaguchi | 242/107.3 |
| 3,578,259 | 5/1971 | Zelnick | 242/107.6 X |
| 3,610,548 | 10/1971 | Quenot | 242/107.3 |
| 3,942,738 | 3/1976 | Rutty | 242/107.3 X |
| 4,121,785 | 10/1978 | Quenot | 242/84.8 |
| 4,288,923 | 9/1981 | Duda | 33/138 |
| 4,439,927 | 4/1984 | Elliott | 33/138 X |
| 4,449,302 | 5/1984 | Drechsler et al. | 242/107.2 X |
| 4,479,617 | 10/1984 | Edwards | 242/107 |
| 4,527,334 | 7/1985 | Jones et al. | 242/107 X |
| 4,603,481 | 8/1986 | Cohen et al. | 242/107.2 X |
| 4,730,783 | 3/1988 | Lamson | 242/107.3 X |

*Primary Examiner*—Donald Watkins
*Attorney, Agent, or Firm*—Eddie E. Scott; Alan R. Thiele; Nelson A. Blish

[57] ABSTRACT

A braking device controls retraction of the tape blade of a retractable blade tape measure. The tape measure includes a tape measure case and a coiled tape blade inside the case. A motor mechanism retracts the tape blade into the case. A braking device contacts the coiled tape blade inside the case before the end of the tape blade strikes the case. The braking device reduces or stops retraction of the tape blade before the end of the tape blade strikes the case.

4 Claims, 3 Drawing Sheets

TAPE MEASURE BRAKING DEVICE

BACKGROUND OF THE INVENTION

1. Field of the Invention

The present invention relates in general to the field of hand tools and more particularly to a tape measure with a braking device used to control the retraction of the blade in a retractable blade tape measure.

2. Background

A tape measure of the type that will incorporate the present invention includes an outer case with a metal tape blade retractably mounted within the case. A retracting mechanism retracts the tape blade into the case. A hook at the end of the tape provides a stop for preventing the end of the tape from retracting inside the case. A clip allows the tape measure to be attached to a belt. A lock releasably secures the tape blade in the desired extended position. The lock typically includes a toggle switch with a lock shoe associated with the toggle switch. When one end of the toggle is depressed, the lock shoe is moved downward against the inside bottom of the case. Pushing the other end of the toggle releases the lock shoe, allowing the tape blade to freely retract into the case.

When the tape blade is being retracted into the case, the retracting mechanism and the portion of the tape blade already retracted into the case build up inertia. This inertia causes the hook at the end of the tape blade to strike the case with substantial force when the blade is fully retracted. The hook and the adjacent portion of the tape blade can be damaged by this force. This problem was recognized by John J. Evans, Jr. and is described in Canadian Pat. No. 1,193,853 issued Sept. 24, 1985 as follows "Blade end failures may also result from excessive whipping of the blade end attachment against the tape housing as the blade is retracted into the housing, particularly if blade retraction is assisted by a spring return".

DESCRIPTION OF PRIOR ART

U.S. Pat. No. 3,942,738 to Edward Charles Rutty assigned to The Stanley Works, New Britain, Conn. patented Mar. 9, 1976 discloses a "Coilable Rule". This disclosure relates to a brake member for a tape measure in which the brake member is symmetrical so that in assembly either end can be placed in contact with the tape measure. There is also provided two detents for the brake member to hold it in either its braking or non-braking position.

U.S. Pat. No. 4,121,785 to Michael Quenot assigned to Stanley-Mabo S.A., Besancon, France patented Oct. 24, 1978 discloses a "Tape Measure Brake". An on-off brake for the winding drum of an encased tape rule comprises a doubleheaded non-rotatable push-button movable along the drum axis to and from a braking position in which a conical projection on the drum tightly frictionally engages a corresponding conical groove in one push-button.

U.S. Pat. No. 4,730,783 to Robert D. Lamson assigned to Spencer Products Company patented Mar. 15, 1988 discloses a "Tape Measure". A gearless, open-faced, direct-drive, spring-rewound tape measure eliminates the need for a manual-rewind handle or gears to increase the spring tensioning force. A spiral spring is retained within a spring-retaining disk which is revolvable about a hub. The hub may be attached to the cover plate and the spring tension adjusted by revolving the cover plate which the spring-retaining disk remains stationary. Alternatively, the cover plate may be coupled through an input disk to revolve the spring-retaining disk and to adjust the tension of a spring which is retained within a spring-retaining well of the spring-retaining disk. In ordinary use, the cover plate is restricted from revolving by compression lock rings which sandwich the cover plate. The tape measure may include a brake to allow holding the tape in an unwound condition.

U.S. Pat. No. 4,288,923 to Werner Duda assigned to Roe International, Inc. patented Sept. 15, 1981 discloses a "Tape Measure". A tape measure includes a housing having an opening and a measuring tape coiled therein including a free end having a hook member attached thereto. The free end of the tape extends through the opening in the housing and a braking lever is pivotally mounted to the housing with its front end adjacent the opening in position to engage the hook member when the tape is in a retracted position. The front end of the lever is normally biased into engagement with the tape, at the housing opening, by a spring, thereby to prevent movement of the tape. A pivot member for absorbing the shock of impact when the hook member engage the front end of the lever during retraction of the tape includes a pivot pin for pivotally mounting the lever to the housing and a shock absorbing element of a deformable, resilient material adjacent the pivot pin for absorbing the shock.

U.S. Pat. No. 4,439,927 to Larry E. Elliott patented Apr. 3, 1984 discloses a "Tape Measure". A coiled metal disposed within the casing which may be retracted or withdrawn through a slot in the front of the casing. In addition, a consumable marker and a scriber are disposed within the casing immediately forward of and along side of the slot through which the coiled tape is withdrawn. Either the consumable marker or the scriber may be positioned via manual actuating means to mark an object being measured at a preselected point along the length of the extended tape. Braking means are disposed within the casing which, when actuated, engage the tape and lock it into position relative to the casing. The braking mechanism is automatically activated when either the consumable marker or the scriber is positioned for marking the object being measured. In addition, the braking means may be activated without marking or engraving the object being measured. A plurality of feed segments disposed within the casing operate to insure that the marker continues to contact the workpiece even though its length is diminished over a period of usage.

U.S. Pat. No. 4,603,481 to Howard Cohen assigned to Irwin Measuring Tool Co. patented Aug. 5, 1986 discloses a "Bumper Indicator". A bumper indicator is disclosed which is adapted to be used on the tape rule of a measuring tool. The bumper indicator is a one piece resilient member having front and rear surfaces and a transverse slit whose configuration is selected to be generally complimentary to the cross sectional configuration of the tape rule on which it is mounted, thereby to frictionally engage and slidably receive the tape rule. The bumper has top and bottom edges and the rear surface of the bumper facing the casing for the tape measure is chamfered from a position below the slit to the bottom edge. The bumper serves to cushion recoil of the tape, as well as to provide an indicator along the tape when it is extended to facilitate repetitive measurements.

SUMMARY OF THE INVENTION

The present invention provides a braking device that controls retraction of the tape blade in a retractable blade tape measure. The tape measure includes a tape measure case and a coiled tapeline or tape blade inside the case. If desired, a lock shoe and lock button may be utilized to fix the tapeline in a specific extended position. One end of the lock button is positioned adjacent the lock shoe and tape. Movement of the lock button and lock shoe allows the blade to be locked in the extended position. A motor mechanism retracts the tape blade into the case. A braking device contacts the coiled tape blade inside the case before the end of the tape blade strikes the case. The braking device reduces or stops retraction of the tape blade before the end of the tape blade strikes the case. Other objects and advantages of the present invention will appear from the following description.

BRIEF DESCRIPTION OF THE DRAWINGS

In the following detailed description of preferred embodiments of the invention reference will be made to the accompanying drawings. A summary of the drawing figures is set out below.

DETAILED DESCRIPTION OF THE INVENTION

Figures 1, 2:
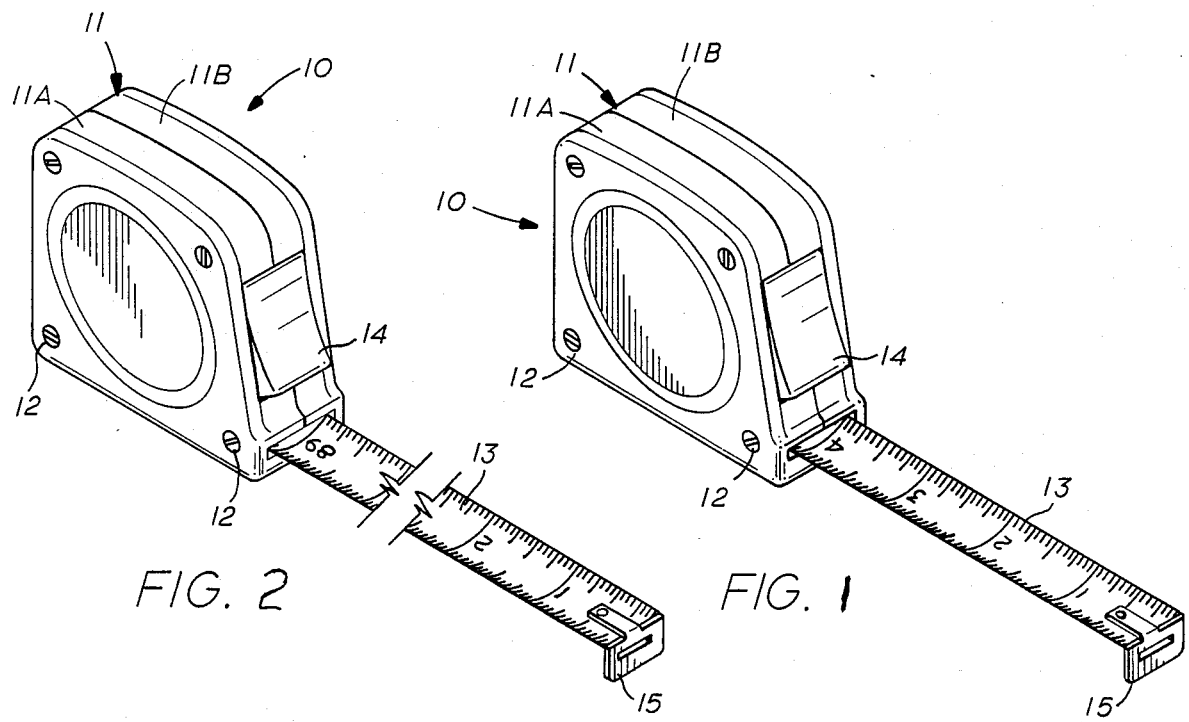
FIG. 1 is a pictorial view of a tape measure with the tape blade in a slightly extended position.
FIG. 2 shows the tape measure of FIG. 1 with the tape blade extended a substantial distance from the case.

Referring now to the drawings and more particularly to FIGS. 1 and 2, a measuring device constructed in accordance with the present invention is shown and generally designated by the reference number 10. The measuring device 10 includes a casing 11 comprising a pair of generally box-like sections 11A and 11B. The sections 11A and 11B are secured together by screws 12. A tape blade 13 extends from case 11 through an opening 14 in the lower front portion of case 11.

A tape retraction means retracts the tape blade 13 into case 11 for convenient storage. Most tape measures use a spring retraction system to retract the blade tape. U.S. Pat. Nos. 3,578,259; 4,479,617 and 4,527,334 generally describe such retraction systems. However, the present invention may be employed with other retraction systems. The tape retraction means generally applies a retracting force when the tape blade 13 is pulled out of the case 11.

To prevent the tape blade 13 from retracting during use, a lock means is utilized to overcome the retracting force of the tape retraction means. An example of a lock means is shown in U.S. Pat. No. 3,578,259 to Charles Zelnick for "Coilable Rule Locking Mechanism" patented May 11, 1971. The extended portion of the tape blade 13 that has been pulled from the case 11 will be locked in place so that the user will not have to hold the tape in an extended position. This frees the user while taking measurements.

A hook 15 at the end of the tape blade 13 provides a stop for preventing the end of tape blade from retracting inside the case 11. Problems have been encountered resulting in damages to the tape blade when the hook 15 strikes the case with excessive force when it is being retracted into the case. As the tape blade is being retracted into the case by retracting mechanism, a substantial amount of inertia is built up. This inertia causes the hook 15 at the tape blade to strike the case with substantial force. Excessive tape blade failures may result from the excessive whipping of the tape blade attachment against the tape housing. This is particularly true today because the length of the tape blades have been increased with modern tape measures.

As shown in FIG. 2, the tape blade 13 has been extended to a substantial length. When the tape blade 13 is being retracted in the case 11 and the hook end 15 approaches the opening 14 as illustrated in FIG. 1, the tape blade may be travelling at a substantial speed. This can cause the blade to whip and the hook 15 to strike the case with substantial force.

Figure 3:
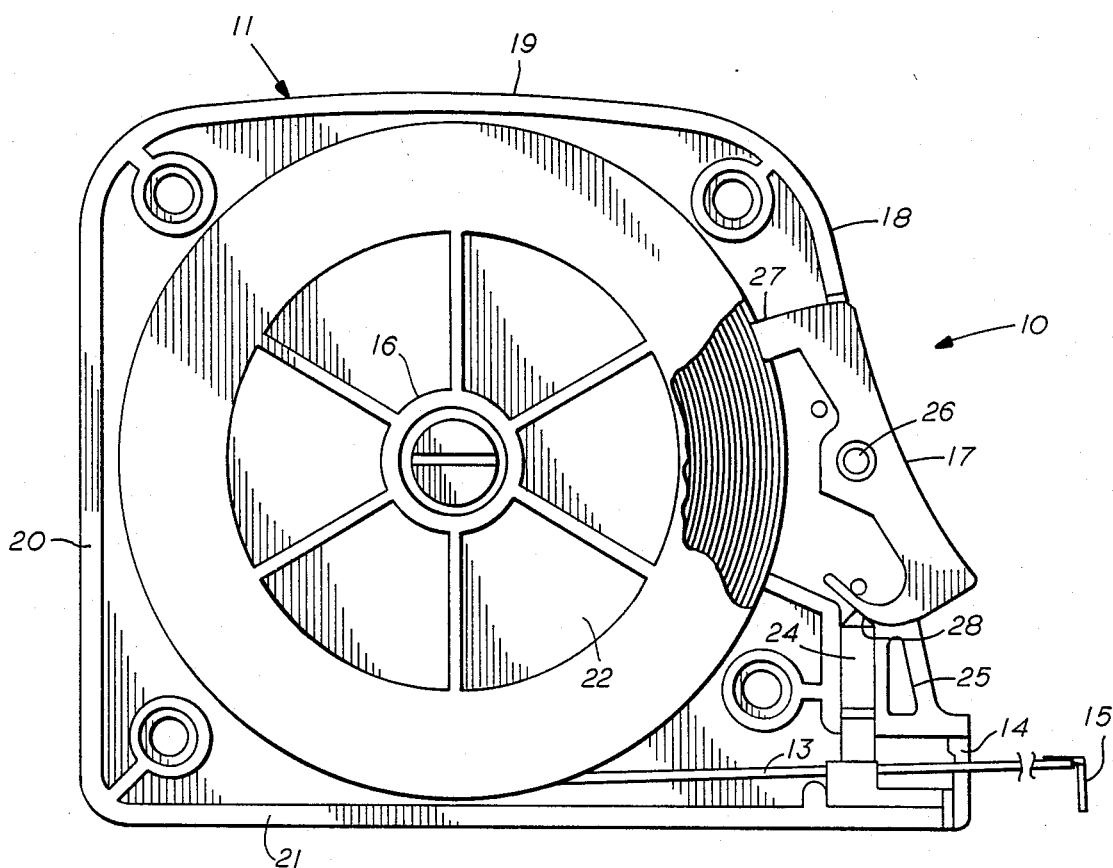
FIG. 3 is a partial cross-sectional view of a tape measure illustrating the braking mechanism of the present invention.

Referring now to FIG. 3, a sectional view of the measuring tape 10 is shown. The case 11 of measuring tape 10 is configured and dimensioned to house a state of the art tape retraction means 16. The coiled tape blade 13 is located inside case 11. A lock button 17 and lock shoe 24 are connected to case 11. The case 11 includes generally flat sections 11A and 11B as shown in FIGS. 1 and 2. The case 11 includes an inclined front wall section 18, top wall section 19, rear wall section 20, and bottom wall section 21. The tapeline 13 is normally coiled in the case 11. The tapeline 13 has a leading end that extends outwardly through slotted opening 14 formed in the casing front wall section 18. The tape hook 15 is secured to the front end of the tapeline 13 in the usual manner. Tapeline 13 is wound on a winding drum 22 and is adapted to be retracted by the spring motor retracting means 16. The spring motor retracting means 16 is secured to the tapeline 13 at its inner end which is received within a slot provided in the casing center post in the usual manner.

Provided in vertical alignment with recess portions 25 in the case sections 11A and 11B is the vertically reciprocating lock shoe 24. The lock shoe 24 is provided with a tapeline engaging pad for engaging the tapeline 13. When the lock shoe 24 is moved to the clamping position, as shown in FIG. 3, the pad depresses the tapeline 13 to form a locking engagement. Movement of the lock shoe 24 is accomplished by movement of the lock button 17. Lock button 17 pivots about the pin 26. When the lower portion of the lock button 17 is pressed, the curved ramp surface 28 forces the lock shoe 24 downward into the tape engaging position.

The upper end of the lock button 17 includes an extension 27 that projects inward toward the coiled tape blade 13. To retract the tape blade 13 the lock button 17 is moved to the non-locking position. In this position, the motor 16 will rotate drum 22 and tapeline 13 will build up on the coil until it contacts the extension 27 at which time it will provide a braking force stopping the tapeline 13 before the hook 15 at the end of tapeline 13 strikes the case 11. The lock button can be pressed at its lower end to move the extension away from the coiled tapeline and allow it to fully retract into the case 11.

In operation, the toggle lock button 17 and lock shoe 24 are normally maintained out of clamping engagement with the tapeline 13. However, when the tapeline 13 has been drawn a predesignated distance out of opening 14 and it is desired to lock it in position to perform a measuring function, the toggle button 17 is pressed at its lower end to revolve it clockwisely about the pivot pin 26 and move the lock shoe 24 sharply down into engagement with the tapeline 13. When the toggle button 17 is pivoted by pressing its upper portion, locking shoe 24 is immediately released to return upwardly. This allows the tapeline to be retracted into the case 11.

When the tapeline 13 is being retracted into the case 11, the retracting mechanism and the portion of the tape blade already retracted into the case build up inertia. This inertia can on occasion causes the hook 15 at the end of the tape blade to strike the case with substantial force when the blade is fully retracted. The hook and the adjacent portion of the tape blade can be damaged by this force.

The upper end of the lock button 17 includes an extension 27 that projects inward toward the coiled tape blade 13. In order to retract the tapeline 13, the lock but 17 is moved to the non-locking position. In this position, the tapeline is retracted and will build up on the 1 it contacts the extension 27. The operator can hold the upper portion of button 17 in the inwardly extending position with the extension 27 closest to the coiled tape. When the tapeline 13 contacts extension 27, extension 27 will provide a braking force stopping the tapeline 13 before the hook 15 at the end of tapeline 13 strikes the case 11. The upper portion of button 17 is then released allowing the extension 27 to move away from the coiled tape and the tapeline can be fully retracted into case 11. The lock button can be pressed at its lower end to move the extension 27 away from the coiled tapeline and allow it to fully retract into the case 11.

Figure 4:
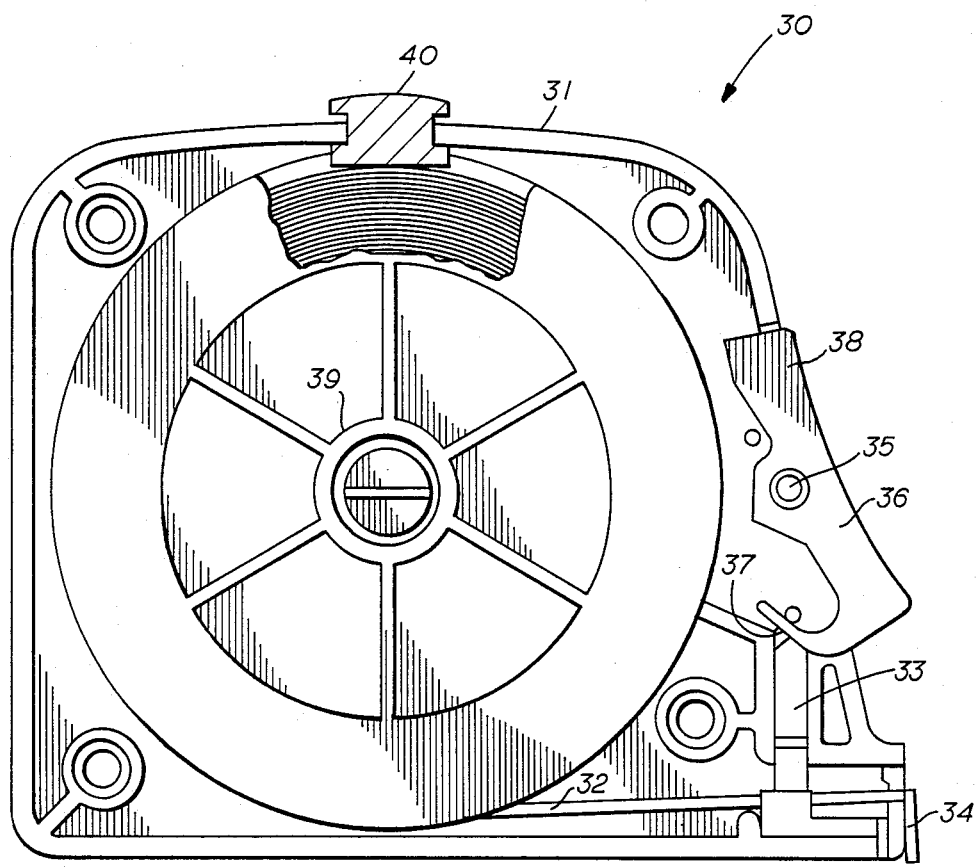
FIG. 4 is a partial cross-sectional view of another embodiment of the braking mechanism of the present invention.

Referring now to FIG. 4, another embodiment of the present invention is illustrated. A sectional view of a measuring tape 30 is shown. The case 31 of measuring tape 30 is configured and dimensioned to house a state of the art tape retraction means 39. The coiled tape blade 32 is located inside case 31. A lock button 36 and lock shoe 33 are connected to case 31. The case 31 includes an inclined front wall section, top wall section, rear wall section and bottom wall section. The tapeline 32 is normally coiled in the case 31. The tapeline 32 has a leading end that extends outwardly through the slotted opening formed in the casing front wall section. The tape hook 34 is secured to the front end of the tapeline 32 in the usual manner. Tapeline 32 is wound on a winding drum and is adapted to be retracted by the spring motor retracting means 39. The spring motor retracting means 39 is secured to the tapeline 32 at its inner end which is received within a slot provided in the casing center post in the usual manner.

Provided in vertical alignment with recess portions in the case is the vertically reciprocating lock shoe 33. The lock shoe 33 is provided with a tapeline engaging pad for engaging the tapeline 32. When the lock shoe 33 is moved to the clamping position, the pad depresses the tapeline 32 to form a locking engagement. Movement of the lock shoe 33 is accomplished by movement of the lock button 36. Lock button 36 pivots about the pin 35. When the lower portion of the lock button 36 is pressed, the curved ramp surface 37 forces the lock shoe 33 downward into the tape engaging position.

A button 40 is located on the top of case 31. The lower portion of button 40 projects inward through casing 31 toward the coiled tape blade 13. To retract the tape blade 32, the lock button 36 is moved to the non-locking position. In this position, the motor 39 will rotate and the tapeline 32 will build up on the coil until it contacts the bottom of button 40 at which time it will provide a braking force stopping the tapeline 32 before the hook 34 at the end of tapeline 32 strikes the case 31. The button 40 is released to allow the button 40 to move away from the coiled tapeline 32 and allow it to fully retract into the case 31 as shown in FIG. 4.

To operate measure tape 30, the toggle lock button 36 and lock shoe 33 are normally maintained out of clamping engagement with the tapeline 32. However, when the tapeline 32 has been drawn a predesignated distance out of the case 31 and it is desired to lock it in position to perform a measuring function, the toggle button 36 is pressed at its lower end to revolve it clockwisely about the pivot pin 35 and move the lock shoe 33 sharply down into engagement with the tapeline 32. When the toggle button 36 is pivoted by pressing its upper portion 38, locking shoe 33 is immediately released to return upwardly. This allows the tapeline 32 to be retracted into the case 31.

When the tapeline 32 is being retracted into the case 31, the retracting mechanism and the portion of the tape blade already retracted into the case build up inertia. This inertia can on occasion causes the hook 34 at the end of the tape blade to strike the case with substantial force when the blade is nearly fully retracted. The hook and the adjacent portion of the tape blade can be damaged by this force.

The button 40 includes a lower portion that projects inward through the case 31 toward the coiled tape blade 32. When the tapeline 32 is being retracted, the lock button 36 is moved to the non-locking position. In this position, the tapeline is allowed to retract and will build up on the coil until it contacts the button 40. The operator hold button is in a position where it is fully extended into the case 31. When the tapeline 32 contacts button 40, it will provide a braking force stopping the tapeline 32 before the hook 34 at the end of tapeline 32 strikes the case 31. The button 40 can be released to move it away from the coiled tapeline and allow the tapeline to fully retract into the case.

Figure 5:
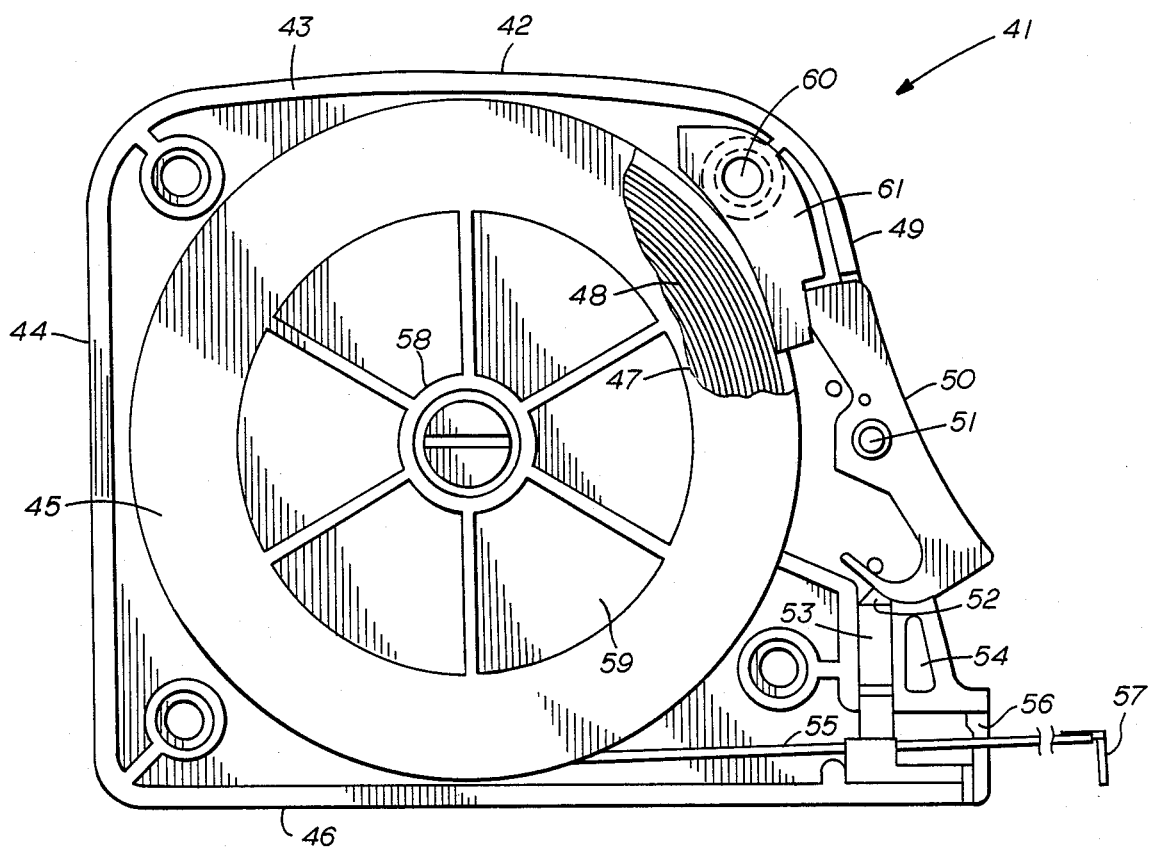
FIG. 5 is a partial cross-sectional view of yet another embodiment of the braking mechanism of the present invention.

Referring now to FIG. 5, a sectional view of yet another embodiment of a measuring tape 41 constructed in accordance with the present invention is shown. The case 43 of measuring tape 41 is configured and dimensioned to house a state of the art tape retraction means 58. The coiled tape blade 55 is located inside case 43. A lock button 50 and lock shoe 53 are connected to case 42. The case 43 includes generally flat side sections. The case 43 includes an inclined front wall section 49, top wall section 42, rear wall section 44, and bottom wall section 46. The tapeline 55 is normally coiled in the case 43. The tapeline 55 has a leading end that extends outwardly through slotted opening 56 formed in the casing front wall section 49. The tape hook 57 is secured to the front end of the tapeline 55 in the usual manner. Tapeline 55 is wound on a winding drum 59 and is adapted to be retracted by the spring motor retracting means 58. The spring motor retracting means 58 is secured to the tapeline 55 at its inner end which is received within a slot provided in the casing center post in the usual manner.

Provided in vertical alignment with recess portions in the case 43 is a vertically reciprocating lock shoe 53. The lock shoe 53 is provided with a tapeline engaging pad for engaging the tapeline 55. When the lock shoe 53 is moved to the clamping position, as shown in FIG. 5, the pad depresses the tapeline 55 to form a locking engagement. Movement of the lock shoe 53 is accomplished by movement of the lock button 50. Lock button 50 pivots about the pin 51. When the lower portion of the lock button 50 is pressed, the curved ramp surface 52 forces the lock shoe 53 downward into the tape engaging position.

The upper end of the lock button 50 contacts a retract control unit 61 that is located above the lock button 50. The retract control unit 61 pivots about pin 60 from an inner position adjacent the coiled tape to an outer position nearer the front 49 of case 43.

To retract the tape blade 55, the lock button 50 is moved to the non-locking position. The operator can maintain inward pressure on the upper portion of lock button 50 maintaining retract control unit 61 in its innermost position. In this position, the motor 58 will rotate drum 59 and tapeline 55 will build up on the coil until it contacts the retract control unit 61 at which time it will provide a braking force stopping the tapeline 55 before the hook 57 at the end of tapeline 55 strikes the case 43. The lock button can be pressed at its lower end to move the upper end of lock button 50 and the retract control unit 61 away from the coiled tapeline and allow it to fully retract into the case 43.

In operation, the toggle lock button 50 and the lock shoe 53 are normally maintained out of clamping engagement with the tapeline 55. However, when the tapeline 55 has been drawn a predesignated distance out of opening 56 and it is desired to lock it in position to perform a measuring function, the toggle button 50 is pressed at its lower end to revolve it clockwisely about the pivot pin 51 and move the lock shoe 53 sharply down into engagement with the tapeline 55. When the toggle button 50 is pivoted by pressing its upper portion, locking shoe 53 is immediately released to return upwardly. This allows the tapeline to be retracted into the case 43.

When the tapeline 55 is being retracted into the case 43, the retracting mechanism and the portion of the tape blade already retracted into the case build up inertia. This inertia can on occasion causes the hook 57 at the end of the tape blade to strike the case with substantial force when the blade is fully retracted. The hook and the adjacent portion of the tape blade can be damaged by this force.

The operator can maintain pressure on the upper end of the lock button 50 which contacts retract control unit 61 that projects inward toward the coiled tape blade 55. In order to retract the tapeline 55, the lock button 50 is moved to the non-locking position. The operator continues to maintains pressure on the upper portion of lock button 50. In this position, the tapeline is retracted and will build up on the coil until it contacts the retract control unit 61. When the tapeline 55 contacts the retract control unit 61, it will provide a braking force stopping the tapeline 55 before the hook 57 at the end of tapeline 55 strikes the case 43. The upper portion of button 50 is then released allowing the retract control unit 61 to move away from the coiled tape and the tapeline can be fully retracted into case 43. The lock button can be pressed at its lower end to move the extension 27 away from the coiled tapeline and allow it to fully retract into the case 11.

The embodiments of the invention in which an exclusive property or privilege is claimed are defined as follows:

1. A measuring tape, comprising:
   a measuring tape casing having an opening;
   a tape blade coiled in the casing, said tape blade having an extension moveable in and out of said opening;
   a tape hook attached to said tape blade;
   motor means for retracting the extension substantially into the casing;
   lock means for movement from a position in which it is out of engagement with the tape blade to a position in which it engages the tape blade, locks the tape blade and holds it in a particular position of extension out the opening; and
   brake means for braking the tape blade when the lock means releases the tape blade and the tape blade is retracted by the motor means, said brake means contacting said tape blade inside of said casing and preventing said tape hook from striking the casing with substantial force, yet allowing the tape blade to be substantially retracted into the casing.

2. In a tape measuring device having a casing with an opening;
   a tapeline having a front end,
   a tape hook on the front end of the tapeline, said tapeline being coiled in the casing and being moveable to different extensions out of said opening;
   motor means for retracting said tapeline substantially into said casing;
   actuator means projecting from the front wall portion of the casing and journaled for pivotal movement from a first pivoted position to a second pivoted position; and
   a lock member connected with said actuator means for movement from a position in which it is out of engagement with the tapeline to a position in which it engages the tapeline;
   the improvement comprising;
   braking means connected to said actuator and being operative to prevent the tape hook from striking the casing with substantial force, said braking means comprising an element that contacts the tapeline coiled in the casing when the tapeline extension is retracting into the casing and brakes the tapeline before the tape hook strikes the casing with substantial force yet allowing said tapeline to be substantially retracted into said casing.

3. A retractable tapeline tape measure, comprising;
   a casing having an opening;
   a tapeline coiled in the casing, said tapeline having an extension that is moveable in and out of said opening;
   a tape hook attached to said tapeline;
   motor means connected to the casing for producing movement of the tapeline;
   lock means for locking the tapeline in an extended position; and
   a brake means connected to the casing for engaging the tapeline to brake the tapeline once it reaches a particular position of extension out the opening, said brake means comprising an element that contacts said tapeline inside said casing before said tape hook strikes said casing and brakes said tapeline and also allows said tapeline to substantially retract into said casing.

4. A measuring tape comprising:
   a measuring tape casing having an opening;
   a tape blade coiled in the casing and being moveable to different extensions out of said opening;
   a tape hook attached to said tape blade;
   motor means for retracting the tape blade into the casing;
   lock means with actuating means projecting through the casing for movement from a position in which it is out of engagement with the tape blade inside the casing to a position in which it engages the tape blade inside of the casing and locks it in a particular extension out of said opening;
   break means inside said casing for braking the tape blade when the tape blade is retracted by the motor means to prevent the tape hook from striking the casing with substantial force yet allowing the tape blade to be fully retracted into the casing.

* * * * *